(12) United States Patent
Efremov

(10) Patent No.: US 11,227,021 B2
(45) Date of Patent: Jan. 18, 2022

(54) SYSTEM AND METHOD OF IDENTIFYING AND TARGETING USERS BASED ON SEARCH REQUIREMENTS

(71) Applicant: AO Kaspersky Lab, Moscow (RU)

(72) Inventor: Andrey A. Efremov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 277 days.

(21) Appl. No.: 16/456,882

(22) Filed: Jun. 28, 2019

(65) Prior Publication Data
US 2020/0257747 A1    Aug. 13, 2020

(51) Int. Cl.
*G06F 16/9535* (2019.01)
*G06N 20/00* (2019.01)

(52) U.S. Cl.
CPC ......... *G06F 16/9535* (2019.01); *G06N 20/00* (2019.01)

(58) Field of Classification Search
CPC .. G06F 16/9535; G06F 16/337; G06F 16/907; G06N 20/00; G06Q 50/01
USPC ......................................................... 707/770
See application file for complete search history.

(56) References Cited

U.S. PATENT DOCUMENTS

| | | | |
|---|---|---|---|
| 9,710,817 B2 | 7/2017 | Vaidyanathan et al. | |
| 2009/0299817 A1 | 12/2009 | Fok et al. | |
| 2013/0290205 A1* | 10/2013 | Bonmassar | G06Q 10/1053 705/321 |
| 2015/0006286 A1* | 1/2015 | Liu | G06Q 30/0269 705/14.53 |
| 2018/0189282 A1* | 7/2018 | Hartlaub | G06F 16/437 |
| 2018/0308124 A1* | 10/2018 | Gao | G06N 20/20 |

OTHER PUBLICATIONS

Wenkai Mo et al: "GEMiner, Mining Social and Programming Behaviors to Identify Experts in Github", School of Electronics and Mechnical Engineering,Nov. 6, 2015, pp. 93-101.
Mehryar Mohri et al.: "Foundations of Machine Learning—Chapter 1" In "Foundations of Machine Learning—Chapter 1", May 14, 2014 (May 14, 2014) pp. 1-9.

* cited by examiner

*Primary Examiner* — Evan Aspinwall
(74) *Attorney, Agent, or Firm* — Arent Fox LLP; Michael Fainberg

(57) ABSTRACT

System and methods are provided for searching users that meet one or more search requirements. Configuration profiles are obtained of computing systems operated by sample users that have at least one determined characteristic. A machine learning model is generated that associates the determined characteristic of the sample users with the configuration profiles of the computing systems of the sample users. Identifying at least one target user that matches the at least one determined characteristic specified in a search query based on analysis of the configuration profile of the computing system of said target user by the machine learning model.

18 Claims, 9 Drawing Sheets

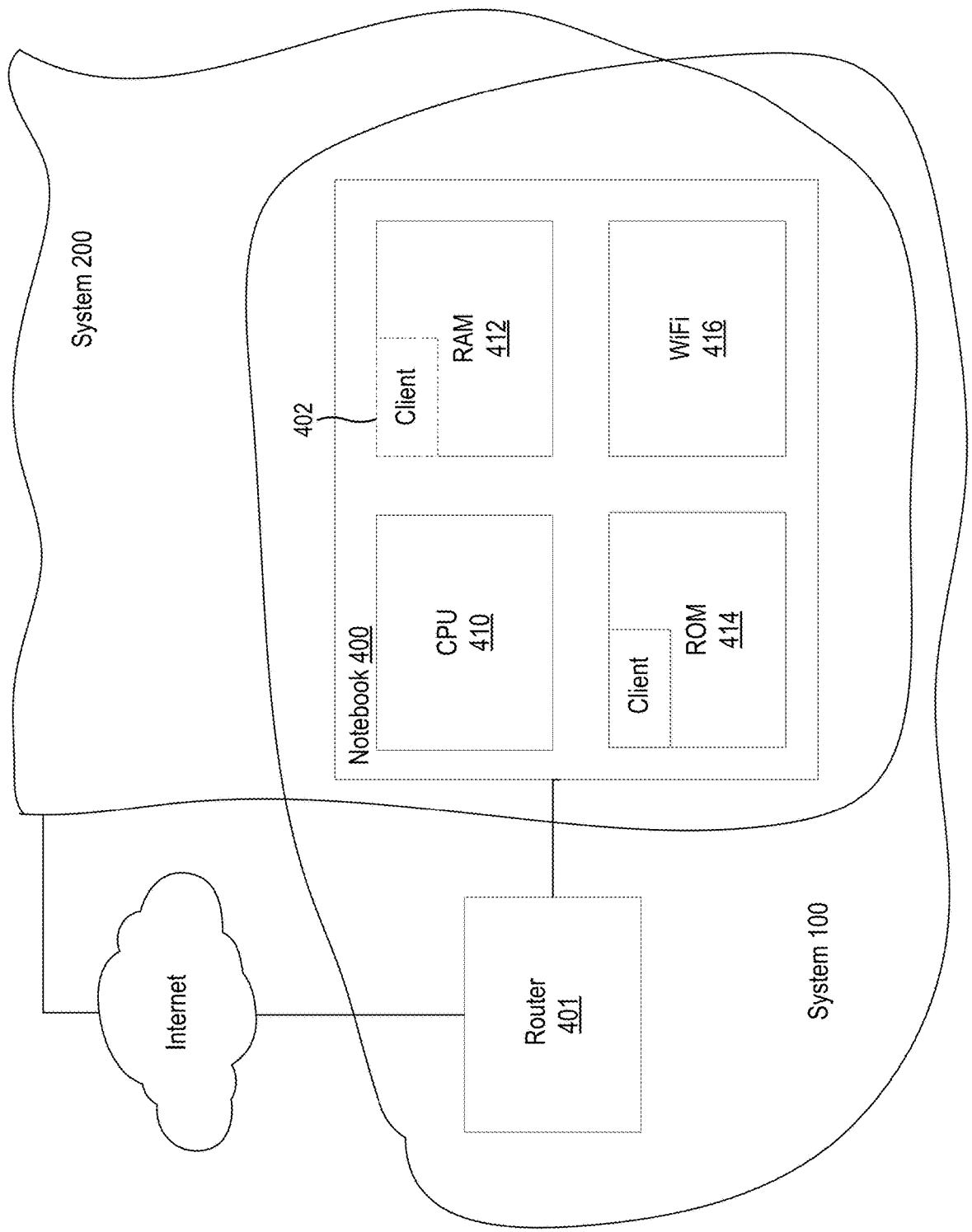

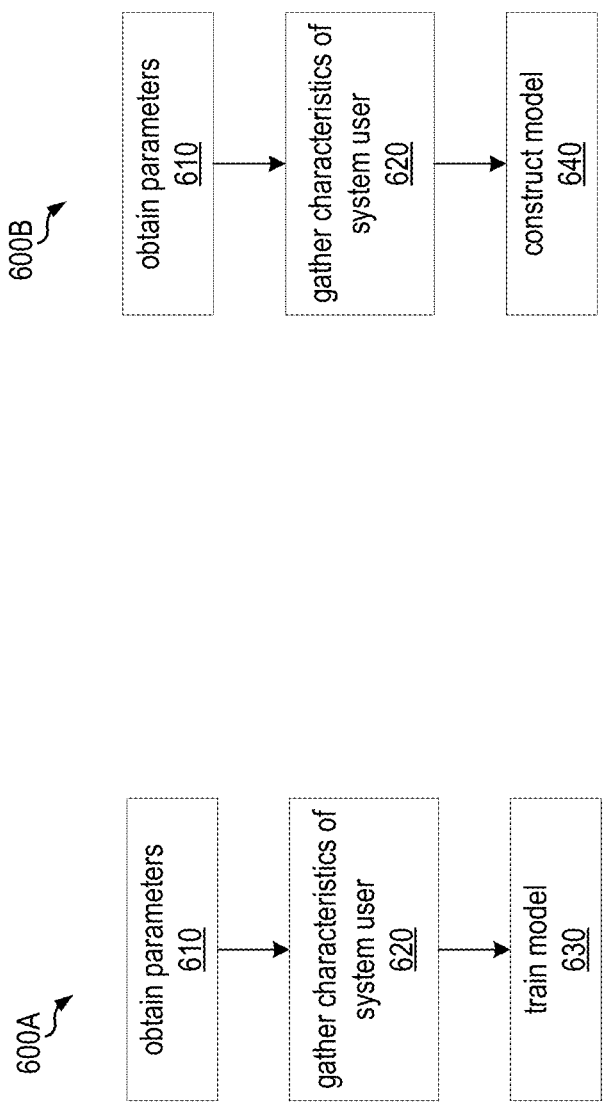

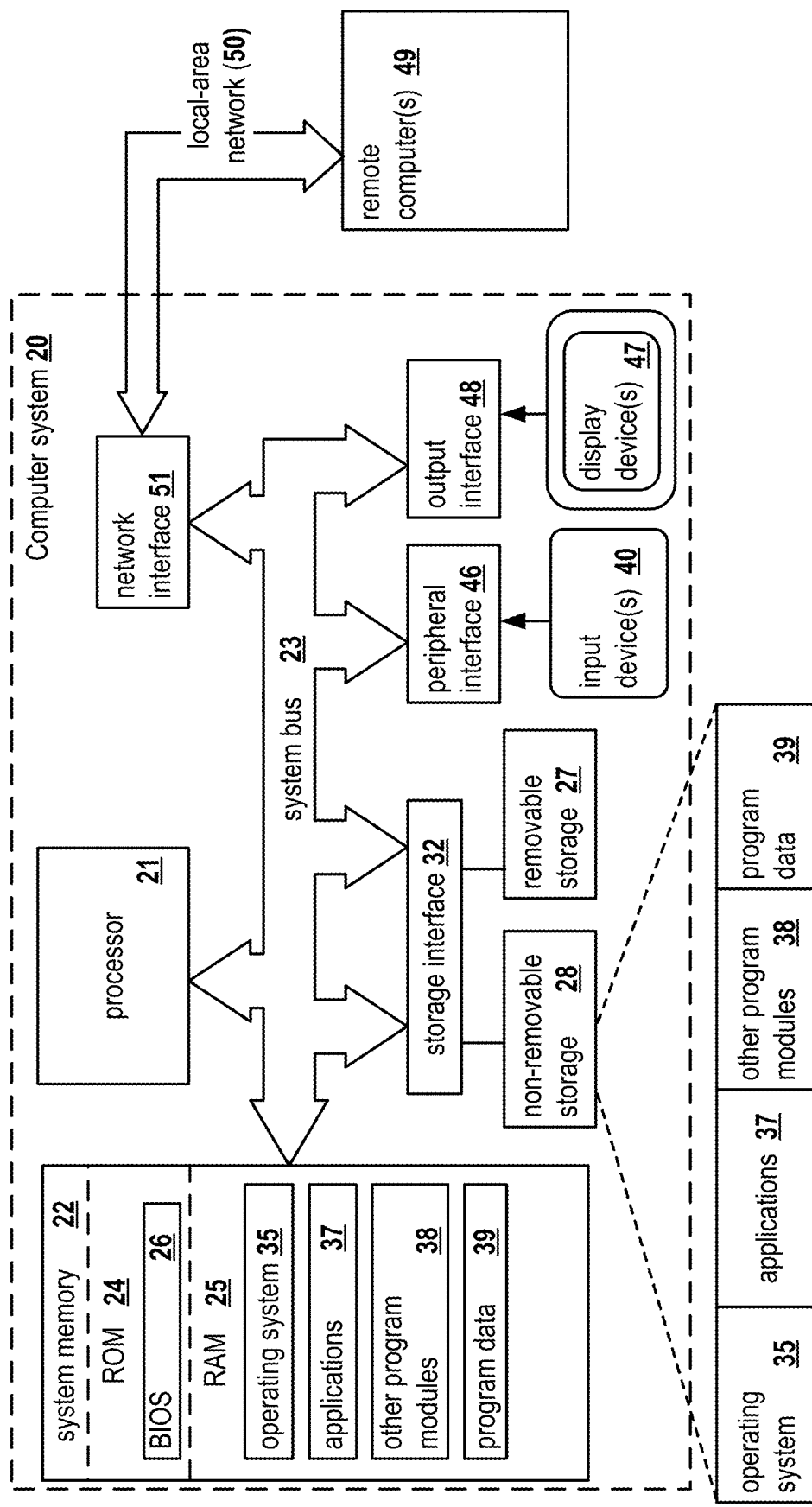

SYSTEM AND METHOD OF IDENTIFYING AND TARGETING USERS BASED ON SEARCH REQUIREMENTS

CROSS-REFERENCE TO RELATED APPLICATIONS

This application claims benefit of priority under 35 U.S.C. 119(a)-(d) to a Russian Patent Application No. 2019103372 filed on Feb. 7, 2019, which is incorporated by reference herein

FIELD OF TECHNOLOGY

The present disclosure relates to methods and systems for identifying and targeting users based on search requirements via a computer system and network.

BACKGROUND

Companies and entrepreneurs resort to advertising services in order to promote their products. Advertising is a transmittal of information about goods and services or ideas of the advertiser through various media, being nonpersonalized, usually for pay, and having the nature of a persuasion. With the development of the Internet, advertising has also made inroads there; according to the latest data more than 20% of advertising is done on the Internet.

The effectiveness of advertising is usually less than it could be, due to the lack of personalization and the addressing of an undefined group of people by the advertising. Producers therefore strive to single out individual groups from the entire collection of users and present to each group its own advertising, calculated for that group. This is known as targeted advertising. Targeted advertising is advertising statements (presentations) connected not to the content of a web page, but to a particular group of users, identified on the basis of their previous behavior or survey data. Known approaches to adaptive runtime advertisements show advertising messages based on an analysis of search queries, profiles, data from network applications of users, and so forth. But, the advertising is oriented not to the actual user demand, but to the probability of such a demand. As a result, the kinds of advertising statements are significantly less than the number of consumers of the product or service.

During the course of the development of the Internet, the methods of delivering advertising to the user have themselves changed. The user encounters advertising not only during surfing, but also in applications having access to the network and to the information boards on the way to work or home. Advertising has one major shortcoming: oftentimes it annoys the user, who does not need the product being advertised, and therefore the user seeks to avoid applications and web resources with advertising. If the user in fact needs the product, but the advertising is too intrusive, this may redirect the user to a competitor.

Thus, the existing advertising products have a low efficiency, and they gather and transmit information about the user and engage in profiling, which may entail legal risks. Advertising annoys the user, and he or she will seek to avoid applications with advertising, which is critical to them, since the application is monetized through advertising.

SUMMARY

Disclosed are system and methods for identifying target users that satisfy certain search requirements (i.e., job requirements, direct marketing targets, etc.) by applying gathered configuration profiles (e.g., hardware, software and data files) of computing systems (e.g., personal computers, laptops, tablets, mobile phones, gaming consoles, smart TVs, smart appliances, etc.) and as well as various public online content (e.g., social news and media and personal and professional networking websites) of target users to a machine learning model trained to determine whether target user meets the search requirements based on the analysis of the configuration profiles of their computing systems and/or online content generated or shared by the target users.

According to one exemplary aspect of the present disclosure, a computer-implemented method is provided for searching users that meet one or more search requirements. The method includes obtaining configuration profiles of computing systems operated by sample users, wherein the users have at least one determined characteristic, and generating a machine learning model that associates the determined characteristic of the sample users with the configuration profiles of the computing systems of the sample users. The method further includes receiving a search query comprising one or more search requirements for target users that match the at least one determined characteristic, and accessing, by a processor, configuration profiles of computing systems of a plurality of target users. The profiles include at least information about hardware, software, and data files of computing systems of said target users. The method further includes analyzing the configuration profiles of the computing systems of said target users using the machine learning model to identify one or more target users that match the one or more search requirements of the search query, and identifying at least one target user that matches the at least one determined characteristic specified in the search query based on analysis of the configuration profile of the computing system of said target user by the machine learning model.

In another aspect, the method further comprises: accessing a plurality of online content associated with the target users, including one or more of personal or professional social networking sites of the target users; analyzing online content posted and/or shared by the target users using the machine learning model to identify one or more target users that match the one or more search requirements of the search query; and identifying, by the processor, at least one target user that matches the at least one determined characteristic specified in the search query based on analysis of the online content of said target user by the machine learning model.

In another aspect, the action of identifying the at least one target user that matches the at least one determined characteristic specified in the search query based on analysis of the configuration profile of the computing system of said target user by the machine learning model is performed without explicit disclosure of the user's qualifications in a curriculum vitae document.

In another aspect, the machine learning model is modified by a training process that includes obtaining the configuration profiles of the computing systems of the sample users having the at least one determined characteristic, executing the machine learning model using at least one characteristic of the sample user as an input value, and correcting the machine learning model based on a comparison of output values of the machine learning model to the configuration profiles.

In another aspect, the machine learning model is configured to correlate the characteristic indicating a specified time duration of experience with a programming language with the configuration profiles indicating files are stored on a system of the user that have a file extension indicating source code files of the programming language and that have a file modification date greater than or equal to the specified time duration.

In another aspect, the machine learning model is configured to correlate the characteristic indicating a specified amount of technical experience with configuration profiles indicating a threshold amount of commits to a code repository associated with the technical experience.

In another aspect, the machine learning model is configured to correlate the characteristic indicating experience with a software development library with configuration profiles indicating presence of the software development library on the system of the target user and further indicating frequency of accessing the software development library.

According to another exemplary aspect of the present disclosure, a system is provided for searching users that meet one or more search requirements. The system includes a memory device storing configuration profiles of computing systems operated by sample users having at least one determined characteristic, and a hardware processor coupled to the memory device. The hardware processor is configured to generate a machine learning model that associates the determined characteristic of the sample users with the configuration profiles of the computing systems of the sample users, receive a search query comprising one or more search requirements for target users that match the at least one determined characteristic, and access configuration profiles of computing systems of a plurality of target users, wherein said configuration profiles include at least information about hardware, software and data files of computing systems of said target users. The processor is further configured to analyze the configuration profiles of the computing systems of said target users using the machine learning model to identify one or more target users that match the one or more search requirements of the search query, and identify at least one target user that matches the at least one determined characteristic specified in the search query based on analysis of the configuration profile of the computing system of said target user by the machine learning model.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 4 shows an exemplary embodiment of the present disclosure.

FIGS. 6A and 6B show methods of constructing models to find users according to an aspect.

FIG. 7 is a block diagram of a computer system on which the disclosed system and method can be implemented according to an exemplary aspect.

DETAILED DESCRIPTION

Figure 1:
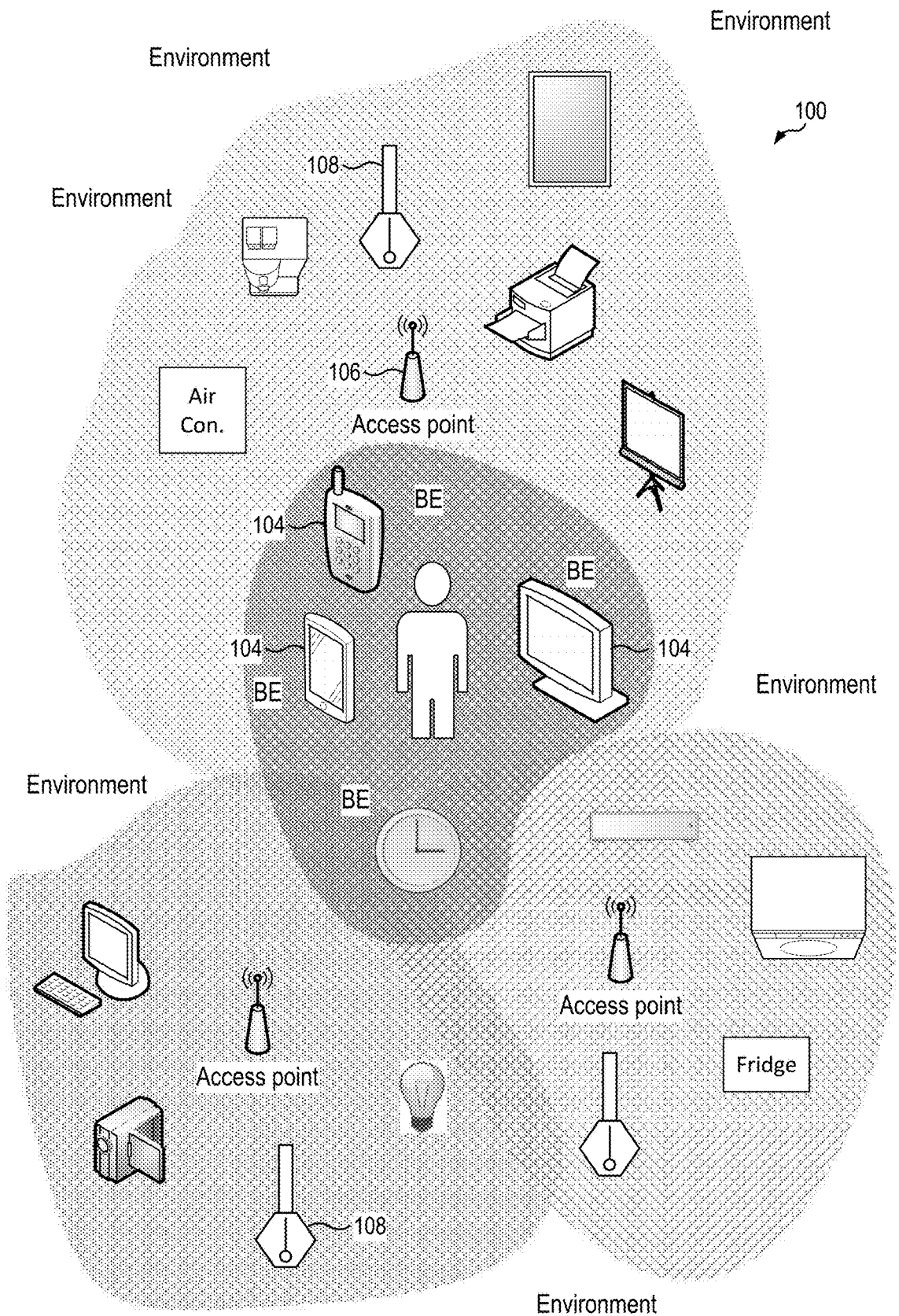
FIG. 1 shows a variant of an observable dynamic system.

The technical result of the present disclosure is to identify third-party modules compatible with a system as a result of carrying out a method of detecting compatible modules, in which system parameters are obtained from elements realizing the functionality of the system and the parameters so obtained are used to interrogate a state model of the system (in a particular instance, a correspondence between the gathered parameters and the possible states of the system is established during the interrogation). The parameters can be obtained in real time, or the parameters are obtained by a client installed on one of the elements of the system (the base element). The elements of the system may be software, hardware, hardware/software, and organisms. The base elements in one particular instance may be personal computer devices which interact with IoT devices in the context of the system. In one particular instance, the system whose parameters are being obtained is dynamic and consists of elements unified by a wireless network, the number of elements connected to the base element being determined by the moment in time and the position in space of the base element and depending on the radius of the zone of coverage of the wireless station providing access to the current wireless network. By interrogating the state model, the correspondence between the requirements of the states and processes in the system and in its elements is assessed. The model may constitute a set of rules for detecting:

an anomalous state of the element, one which is a function of the parameters of the element;

an anomalous state of the system, one which is a function of the parameters determining anomalous states of the elements of the system;

an anomalous process of the element, one which is a time function of the state of the element;

an anomalous process of the system, one which is a time function of the state of the system.

In another instance, the state model of the system is an aggregate of models of usage and reliability variants.

As a result of the interrogation of the model, the anomaly is detected and the system parameters may be also identified of which the anomaly is a function, where the anomaly may be at least:

a state of an element deviating from the required state and being a function of the parameters of the element;

a state of the system deviating from the required state and being a function of the state of an element;

a process of an element deviating from the required one and being a time function of the state of the element;

a process of the system deviating from the required one and being a time function of the state of the system;

a state of the environment with which the system is interacting, deviating from the required state and describable by the parameters of the system;

a process of the environment with which the system is interacting, deviating from the required one and describable by the parameters of the system.

The anomaly may be additionally described, for example, by a class or element of the system whose parameters define the anomaly. The anomaly so detected may relate to anomalies of functioning, where the anomaly of functioning is a lowering or loss of the ability of the system or an element of the system to perform a predetermined function.

After detecting the anomaly, a model for recovery methods is examined using information about the detected anomaly and a recovery method is determined as a result of the model examination, where a specific recovery method ensures that the system and elements meet the requirements. In a particular case, the examination of the model includes determination of correspondence between anomalies and recovery methods. In another case, the recovery of the system ensures compliance with the system design requirements. Recovery can also be accomplished by stabilizing the abnormal state or process. In the case when an anomaly is detected in operation, a method is determined as a result of a model examination, which, when implemented, ensures the recovery of the required system functioning when an anomaly arises. The detected method, when implemented, performs recovery due to transition of the element or system from the anomalous state or process to the required one (elimination of the anomaly). In the particular case, the required state or process is compliance with the requirements for the system according to the classification of FURPS+ (i.e., "FURPS Plus"). In the case when certain methods at least two select the element for such a method that corresponds to the user profile. The recovery method model may refer to descriptive models.

After determining the recovery method, a third-party, system-compatible tool is defined that can implement this recovery method. The tool can be selected from the tool database in which the recovery method is the name of the table. The correspondence between the recovery methods and the recovery module for the subsequent selection can be carried out when preparing the specification for the module, and the correspondence itself is established by entering information about the facility in a table whose properties correspond to anomalies. In the case that at least two modules are determined, the module is chosen depending on the user profile or the reputation of the manufacturer of the module or the reputation of the supplier of the module.

The present disclosure abandons the random nature of advertising, and advertising messages are transformed into a notification of the user as to a problem and the most effective methods for its solution. Aspects of the present disclosure allow one to avoid the indeterminacy and probability, so that the present proposal cannot be considered an advertising, and instead it is a preventive system of user notification, which inter alia reduces the resources spent on providing the information, such that it is carried out for those who actually need it. The advertising products determine the user preferences and probable needs, and send information to the user about the product or service which may be of interest to them, and which the user might need. The present disclosure conducts a monitoring of the user's environment, discovers an actual problem (or its imminent occurrence) and an actual need, provides information about this, and proposes a possible solution which may be implemented, including the acquisition of certain products or services.

The average user is not able to foresee many technical problems with devices; such a user does not have sufficient technical familiarity to assess the characteristics of a product in order to solve a problem which is occurring or has occurred, yet this information is in possession of the manufacturer. However, the manufacturer does not know the user who is in need of the product, and therefore is forced to carry out market research by probabilistic and statistical methods, and construct a survey model. The present disclosure is able to detect problems with a device and in its environment (including the Internet of Things, or IoT), and is able to find an effective preventive solution of the problem. This system does not require the installing of additional modules, but rather is realized by the actual clients, for example, an antivirus software.

The present solution may be used at least to promote: electronics, information technology (IT) providers, IT services, medical products, healthcare providers, health product and service promotion, labor market products and services, repair and construction materials and services, cleaning services, and food products.

A system is a collection of elements in relation and connection with each other, forming a definite whole or unity. It is a set of elements which are interacting by design, in which an element of the system may be another system, known as a subsystem; the system may be a controlling system or a controlled system and it may include hardware (e.g., devices), software (e.g., programs) and interaction with humans (thus, a human may be an element of the system) or with another biological organism. The elements are unified in such a way as to perform an overall functional task. By design, requirements are placed on the system (e.g., per the classification FURPS+):

functionality or functional requirements: properties, capabilities, security. These are the primary requirements used to construct the use case diagram.

usability or requirements on usage convenience (UX): the human factor, esthetics, consistency, documentation.

reliability or requirements on dependability: the frequency of possible crashes, fault resistance, restorability, predictability of stability.

performance or requirements on the productivity: response time, resource use, effectiveness, power, scalability.

supportability or requirements on support: possibility of support, reparability, flexibility, modifiability, modularity, expandability, possibility of localization.

Aspects of the present disclosure can be used with the labor market. One of the largest costs during recruitment (i.e., human resource management) is the search for users' curriculum vitaes or résumés and the evaluation of whether such curriculum vitaes meet certain requirements of a job opening or vacancy (e.g., skills, certifications, education degrees, experience). Given the absence of standards on filling out, formatting, or arranging a curriculum vitae, this aspect of recruitment may take up a lot of time and resources to perform. For example, sometimes the job seeker has not fully filled out their curriculum vitae and/or has left out important details, so that the relevant specialist might get overlooked, or this results in further labor expenses on the part of the recruiter to clear up the omissions. The proposed system and method described herein make it possible to assess certain requirements without indicating them in a curriculum vitae. The described aspects of the present disclosure enables assessment of an individual's fulfillment of certain requirements using system-collected data without needing such requirements to be explicitly disclosed on the individual's curriculum vitae (i.e., user-generated data). The technology carries out a categorization of specialists by means of a previously trained model based on data gathered from the devices of job seekers.

A system realized in accordance with a design should meet the design requirements during its functioning. A particular instance of requirements is the performance which the system/element should provide at a given time (for example, requirements on FPS or 100 requests per second from at least 10 users).

The state of an element of the system is the set of attributes of an element of the system at a given time, being a function of the parameters of the element.

The state of the system is the set of attributes of the system at a given time, being a function of the parameters of the system. It is also defined as the aggregate of states of the elements of the system at a given time.

A process is a change in the attributes of an element of the system or those of the entire system in an interval of time, being a time function of the state.

A parameter (of an element, system, or process) is a quantity characterizing a particular attribute of a process, phenomenon, element (including a device, software, organism) or system. Quantitatively, any given system is described by an aggregate of quantities which can be broken down into two classes: parameters (Π), describing primary attributes of the system and being the initial data for the investigation of the system; and characteristics (X), describing secondary attributes of the system and being determined as a function of the parameters of the system: $X = f(\Pi)$. The parameters of the system are subdivided into internal parameters of the system, which describe the structural and functional organization of the system, and external parameters of the system, describing the interaction of the system with the environment (in relation to the system). The internal parameters include: structural parameters, describing the makeup of elements of the system and its actual structure; and functional parameters, describing the functional organization (the process of functioning) of the system. The external parameters include, for example, workload parameters, indicating how often the resources of the system are used and in what volume. In the general case, these are parameters of the interaction of the system with its environment.

The characteristics of the system are divided into global characteristics, showing the effectiveness of functioning of the system as a whole; and local characteristics, describing the quality of functioning of individual elements of the system. The global characteristics of the system may include: power characteristics or productivity characteristics, showing the speed of attaining the desired purpose of the system; time characteristics, describing the time aspects of the functioning of the system; reliability characteristics, defining the reliability of functioning of the system; and economic characteristics in the form of cost indicators, showing the economic feasibility of the use of the system.

It is clear from what is described above that one distinguishes a parameter and a characteristic in practice. A characteristic is a function of at least one parameter. In the present application, we shall not distinguish parameters and characteristics, using the term "parameter" for the former and the latter.

An anomaly is a deviation from the requirements. The requirements may be design requirements, for example, for hardware/software complexes, or public health requirements. Deviations from the requirements may be states or processes. Accordingly, one distinguishes anomalous states and processes. A particular instance of an anomalous process is a gradual failure, while anomalous states are a sudden failure or crash. Anomalies may be caused by a deviation from requirements of at least one parameter, that parameter also being an anomaly, or anomalous parameter.

A model is an abstract representation of reality in a particular form (for example, in mathematical, physical, symbolic, graphic or descriptive form), configured to represent certain aspects of that reality and able to produce responses to questions being studied. A model may describe states, processes, anomalies (anomalous states, processes, and parameters), the skilled person (user), and products (devices, software, services). The form may be expressed by using templates, conventional expressions, rules (mapping of an input onto an output), neural nets, decision trees, and so forth.

A dynamic system is a system the number of whose elements is not constant but determined by the position in space of an element, taken as a reference point (base element), and at a moment of time. For example, a dynamic system is one which consists of elements (realized in the form of hardware/software) unified by a wireless network, the number of elements connected to the base element being determined by the moment of time and the position in space of the base element and depending on the radius of the coverage zone of the wireless station providing access to the current wireless network. An example of a dynamic system 100 is shown in FIG. 1, which shall be described below.

Figure 2A:
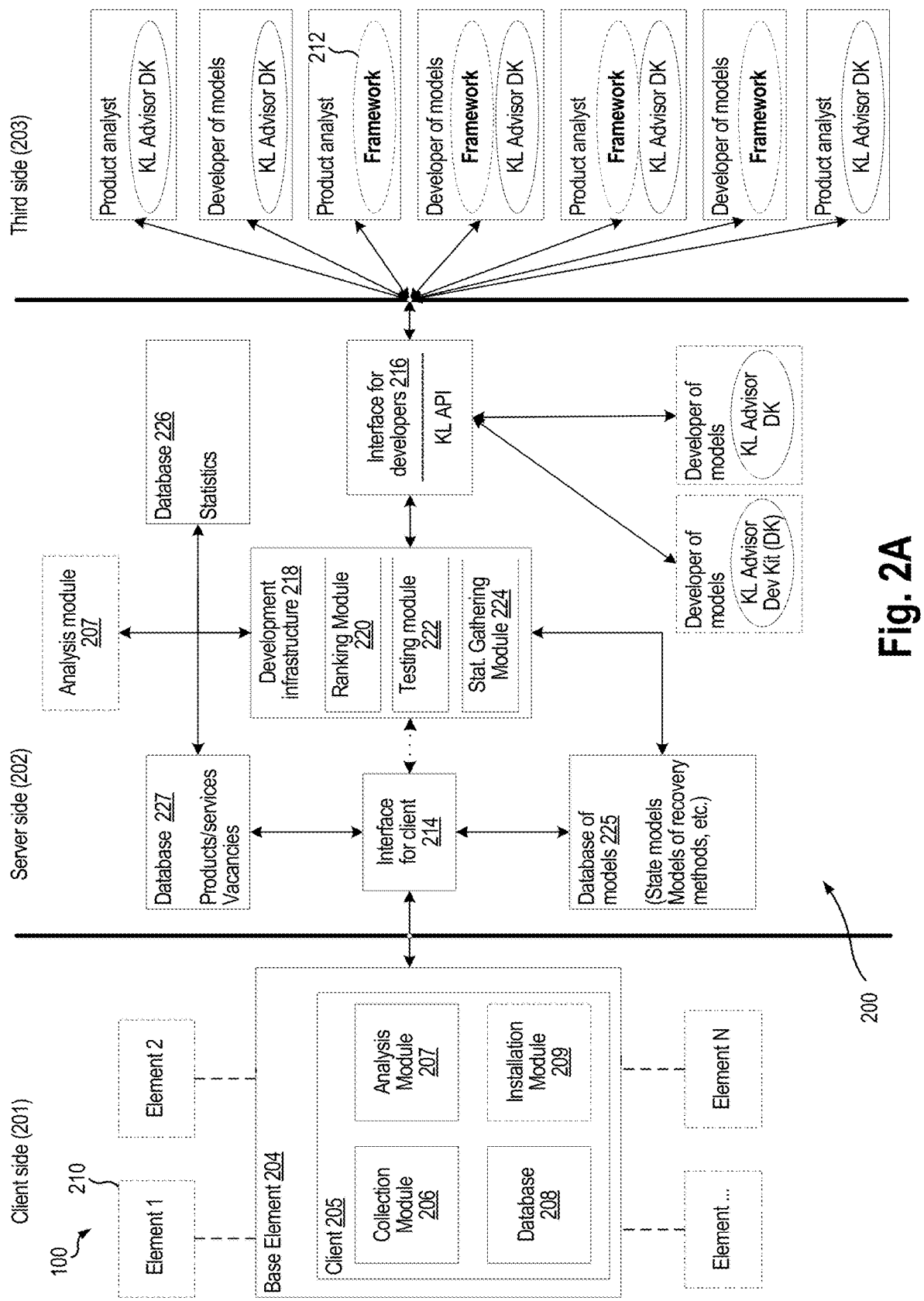
FIG. 2A shows a system of preventive interaction with a user according to an aspect.

FIG. 2A shows a system 200 of preventive interaction with a user. The system 200 includes a client side 201, a server side 203, and a third side 203. At the client side is situated the system 100 being observed, which includes at least one element 210 of the system with an installed client 205 (a base element 204), where the client 205 may be configured to collect the parameters of the system and to interact with the server side. At the third side is situated (third-party) software/hardware for the development of models, product descriptions/specifications, and so forth. The server side interacts with the client 205 and obtains the developed models from the third side. At the server side, there occurs a testing of the obtained models, a ranking of them, a gathering of statistics on the clients, the generating of configuration profiles and their updating for the clients, and the providing of an infrastructure for the development of the models.

The client 205 includes a collection module 206, an analysis module 207, and a database 208. Optionally, the client may include an installation module 209. The collection module 206 may be configured to gather the parameters of the system 100, telemetry in one particular instance. The analysis module 207 transforms the parameters into states and processes and analyzes the parameters, states, and processes to discover anomalies. The analysis by the analysis module 207 is done by a module of interrogating the models, for example, the state models. This module 207 also analyzes the anomalies to determine methods of recovery, and discovers modules which allow the recovery method to be carried out, for which the models are also interrogated. The analysis module 207 may optionally be situated at the server side. The installation module 209 may be configured to implement software which realizes the recovery method. The database 208 stores the parameters and states, making it possible to obtain information by the analysis module 207 as to the processes in the elements and in the system, since a process is a change in the states over time.

At the third side, the development modules create descriptions of products (including services), generate models, and send the results to the server side. The development module may include a framework 212 and other software to formalize a description of products which is easily understood by a human being in a format supported by the modules on the server and client side, and also to generate models, including those based on the formalized descriptions, and to send the result to the server side.

The server side provides an interface 214 for communication with the client side and the third-party development modules (216). A development infrastructure 218 is realized at the server side which includes at least: a ranking module 220, a testing module 222, and a statistics gathering module 224.

The ranking module 220 may be configured to determine the models which will be sent to the specific client and which will be interrogated by the analysis module 207. The testing module 222 may be configured to check the new models obtained from the development modules. The models are kept in a models database 225. The statistics gathering module 224 receives data from clients according to the collected parameters, the models interrogated, and the results of the interrogation of the models, and generates statistics which are kept in a statistics database 226. The accumulated statistics are used to develop new models, debug existing ones, and so forth, and are accessible across an interface to the developer.

FIG. 1 shows a variant of a dynamic system 100 being observed by one or more sensors 108, the core of which is a base element (BE) 104 (similar to the base elements of FIG. 2A) on which a client is installed. The base elements 104 may be notebooks, smart watches, smartphones, personal computers, and so on. The base element 104 is linked to other elements in the example via an access point 106. Thus, the number of elements of the system is determined by the radius of action of the access point 106 in whose coverage area the base element is found. In the context of the given system 100, in a particular instance a human being may be considered to be an element of the system in the capacity of an object or subject of control/diagnostics/monitoring. In the case when the human being is considered to be an object of control/diagnostics/monitoring (for example, the recording of a cardiogram), the other elements of the system are subjects of control. The concept of an anomaly in the context of a human being as an element of the system may be defined as a deviation from the normal states of processes in the context of medical requirements.

In another case, a human being as well as the environment are considered as being objects of control/diagnostics/monitoring, yet now they are external with respect to the system 100. In a given case, the elements of the system collect parameters, being external in accordance with the indicated classification, and on the basis of these parameters the states and processes of the object of control/diagnostics/monitoring are determined, while the methods of recovery will be determined with respect to the object of control/diagnostics/monitoring, which may be either a human being or the environment.

Figure 2B:
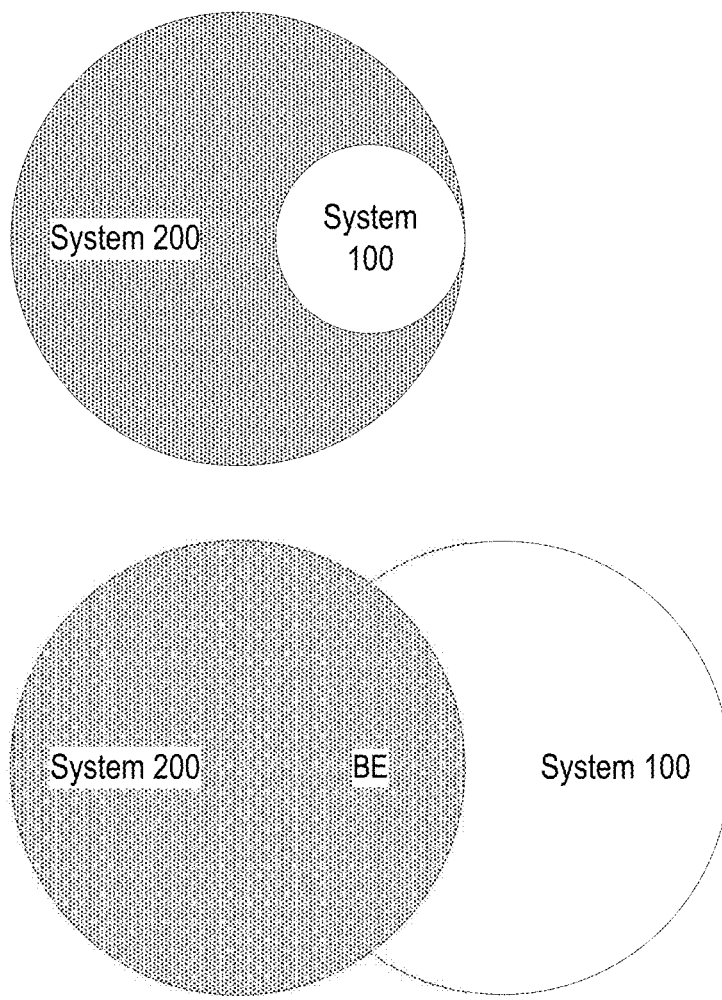
FIG. 2B shows the relations between the system of preventive interaction with a user and the observable dynamic system.

The relations of the system 200 and the observable dynamic system 100 are discussed in FIG. 2B. The dynamic system 100 may be either a subsystem of the system 200 or intersect element by element with the system 200, for example, the base element 104 may be the general portion of the system 200 and a portion of the system 100 (as is shown in FIG. 2B).

Figure 3A:
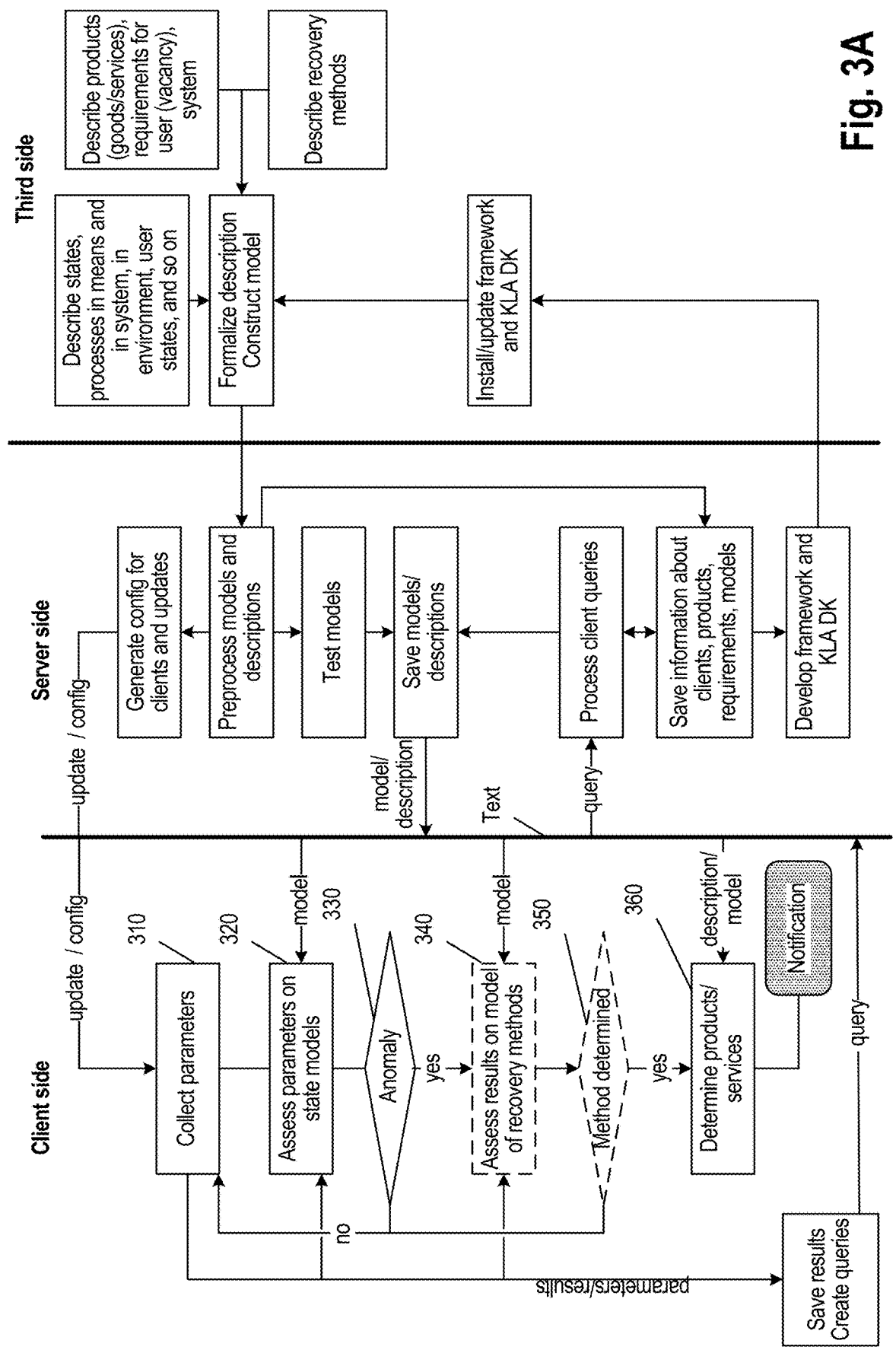
FIG. 3A shows the method of determining compatible modules for systems with anomalies according to an aspect.

The system 200 may be configured to implement the method of selecting compatible modules for systems with anomalies (see FIG. 3A), where the collection module 206 of the client 205 in step 310 collects the parameters of the system 100 from the elements realizing the specified functionality of this system 100. The gathering may also be done in real time. The gathered parameters are saved in the client database and in step 320 the gathered parameters are used by the analysis module 207 of the client 205 to interrogate the state models of the system. The analysis module 207, in interrogating the state models, assesses the conformity of the state of the system 100 and its elements to the requirements for the system. The state models may describe as normal the processes and states conforming to the required ones, and as anomalous those for example describing a fault state or failure process. The state models may be kept in the client database 208. In another particular instance, the state models are presented by the server side to the analysis module of the client on demand. The models describing the states may be as diverse as possible: regression, classification, categorization, and other models. The models describing the states may be based on decision making trees, neural nets, or logic rules of the type IF (or/and/xor) THEN, and so forth.

In step 330, as a result of the interrogation of the models an anomaly is detected in the system. The anomaly may be at least: a state of an element deviating from the required state and being a function of the parameters of the element; a state of the system deviating from the required state and being a function of the state of an element; a process of an element deviating from the required one and being a time function of the state of the element; a process of the system deviating from the required one and being a time function of the state of the system; a state of the environment with which the system is interacting, deviating from the required state and describable by the parameters of the system; and a process of the environment with which the system is interacting, deviating from the required one and describable by the parameters of the system.

After discovering an anomaly, information about the discovered anomaly is formalized for further processing, where it may be characterized by the class (and/or name) of the anomaly and the system parameters of which the anomaly is a function. In addition, the element of the system whose parameters determine the anomaly may be indicated as a characteristic. The class and name of the anomaly depend on which requirements are being deviated from. Examples of anomalies may be: weak signal of a router, degradation in performance of an element (CPU, HDD, SSD, RAM and so on), insufficient RAM space, data loss/corruption, and so forth. If the anomaly involves a gradual failure, the anomaly is not the actual loss of data or shortage of memory volume which is determined, but rather the imminent occurrence thereof. In a particular instance, the anomaly has the Functionality class (in the FURPS+ classification) and involves, for example, the functioning of the system, where the functioning anomaly is a lowering or loss of the ability of the system or element of the system to perform a function dictated by its design or purpose.

Having detected an anomaly in step 340, and using the information about the anomaly, the model of the methods of recovery is interrogated. There may be different models of methods of recovery, as well as state models; in a particular instance, descriptive models are used. Furthermore, as a result of the interrogation of the models, in step 350 the method of recovery is determined which, when implemented, will ensure a conformity of the system and the elements to the requirements, for example, it will ensure the recovery of the required functioning of the system. The method of recovery so discovered can both stabilize the anomalous state or process (halt the development of the anomaly, which is useful for gradual failures) and bring about a recovery of the system by switching the element or system from the anomalous state or process to the required one (elimination of the anomaly), where the required state or process conforms to the requirements for the system by the FURPS+ classification. There can be more than one detected recovery method, in which case the definitive method is chosen on the basis of the user's profile of the base element, which may involve various characteristics: gender, age, location, marketing class, purchasing power (solvency), level of IT literacy, and so forth.

In the step 360, a third-party compatible module is selected (in one instance, the method may select not a module, but a product) realizing the functionality of the recovery method found as a result of the interrogation of the model of recovery methods. Both models and databases may be used for this, in which the name of the recovery method corresponds to modules which are guaranteed to realize the recovery method. As for the recovery methods, there may be more than one available recovery module, in which case the modules are chosen based on the user's profile; in addition, the reputation of the manufacturer (vendor) of the recovery module may be taken into account. The selected module can be implemented by various methods in the system, one such method for software being the installation thereof by the client's installation module. Compatibility is determined on the basis of an analysis of the specification of the system or module.

In a particular instance, the recovery methods might not be determined (skipping steps 340 and 350) and the module will be determined on the basis of information about the anomaly. In this case, after performing step 330 there is a jump to step 360.

Figure 3B:
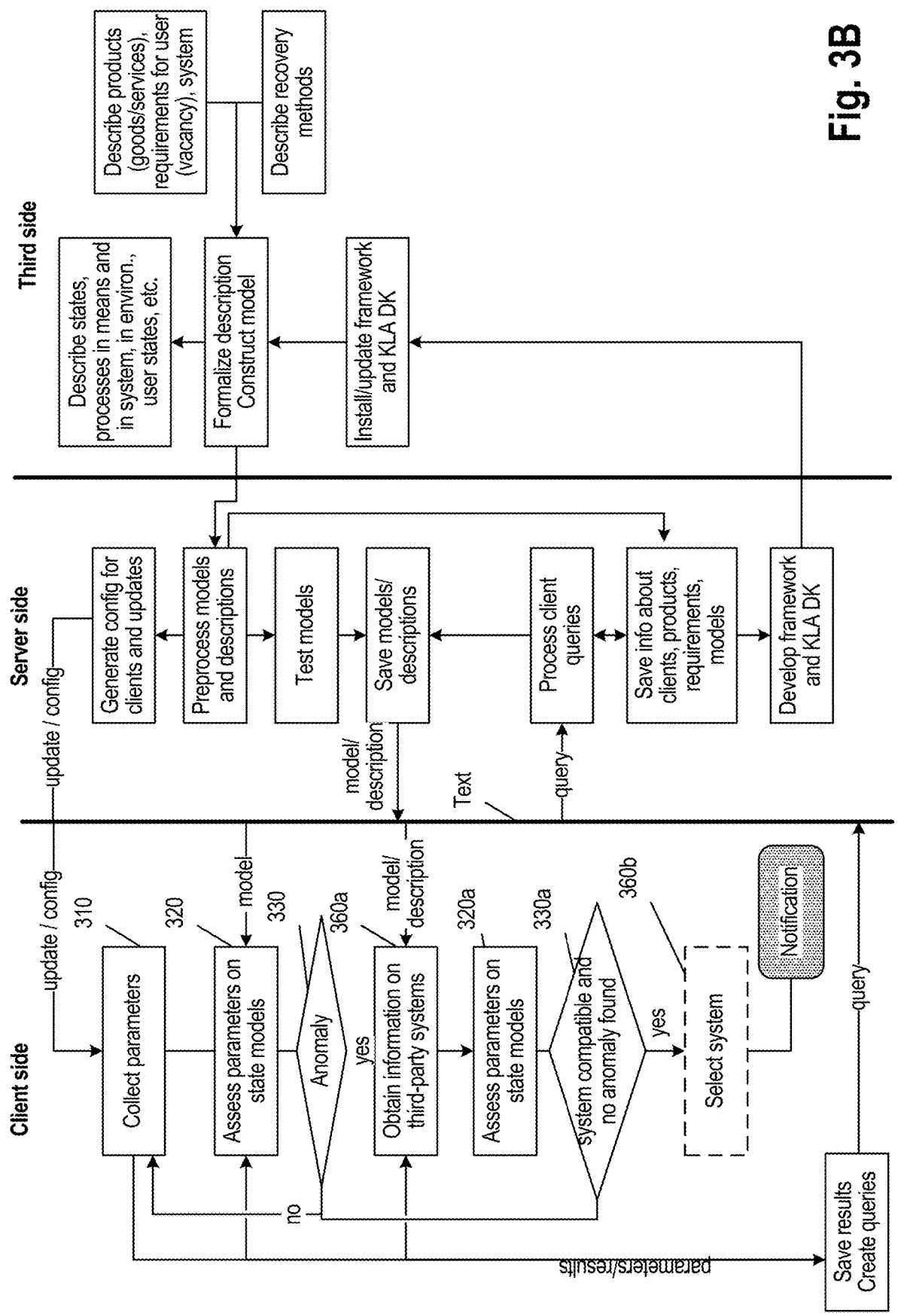
FIG. 3B shows the method of detecting compatible modules according to an aspect.

The above-described method may be carried out otherwise by the system 200 (see FIG. 3B). The steps from 310 to 330 repeat the method described above, but then divergences begin. After detecting the anomaly which is characterized at least by parameters of the elements or system of which it is a function, in step 340*a* a database of available third-party systems or modules or information about at least one module is obtained. Next, in step 320*a*, once again the state model of the system is interrogated using the set of parameters collected in step 310, but in this set the parameters of the system of which the anomaly is a function are replaced by equivalent parameters of the module from the database of available third-party modules. On the basis of an interrogation of the state model in step 330*a*, at least one module is found in the database of third-party module which: is compatible with the system; and no anomaly is found when interrogating the state model with the use of the replacement parameters of that module.

In step 330*a*, more than one module meeting the indicated criteria may be found; in that case, of the module found there is selected one module in step 360*b* in one particular instance, for example based on the user's profile of the base element and/or the reputation of the manufacturers/providers of the module found. In another particular instance, the user is notified about all module discovered (the list may be first ranked). The chosen module may be installed either in place of or in addition to the module realizing the element of the system whose parameters determine the anomaly.

For better understanding, let us consider a simplified example (FIG. 4). The client 402 (client software) is installed on a notebook 400, which in turn is connected to a router 401. In the terms of the present disclosure, the notebook is the base element and forms, together with the other element, or router 401, the system being investigated. In turn, the base element itself consists of elements, so that the notebook in the context of the investigated system is a subsystem. The client 402 gathers the parameters of the system and the elements, where the elements are at least the central processor unit 410, the RAM 412, a nonvolatile storage device (NVRAM) 414, a wireless communications module 416, and a router 401. In the present example, the NVRAM is realized by a solid state drive (SSD), while the router 401 is realized by an external router with WPA2 software encryption. The client 402 gathers the following parameters: S.M.A.R.T. (Self-monitoring, Analysis, and Reporting Technology) attributes of the NVRAM (such as the Reallocated Sector Count); data on the traffic encryption (e.g., yes/no, type of encryption); the traffic volume in both directions, the traffic density (volume per unit of time); the channel speed; the router signal power; and the specification of the module, such as NVRAM (type (Type), volume (Value), form factor (FF), interface (Interface)); and router (Wi-Fi (IEEE) standard, frequency range of Wi-Fi devices (Spectr), hardware encryption support (HBE)).

Table 1 is presented below, aggregating the parameters which are gathered. From this, one may obtain the state at a given time $S_n$, as well as the process $S_n \rightarrow S_{n+1} \rightarrow \ldots \rightarrow S_n+ \ldots$.

TABLE 1

| State | $S_1$ | $S_2$ | $S_3$ | $S_4$ | $S_5$ | $S_6$ | $S_7$ | $S_8$ | $S_9$ |
|---|---|---|---|---|---|---|---|---|---|
| SMART attribute 05, RSC | 3 | 3 | 3 | 4 | 4 | 5 | 6 | 8 | 25 |
| Encryption Enc | 1 WEP | 1 WEP | 1 WPA2 | 1 WPA2 | 1 WPA2 | 1 WEP | 1 WEP | 1 WEP | 1 WEP |
| Speed V, Mbit/s | 80 | 82 | 10 | 10 | 10 | 60 | 70 | 80 | 78 |
| Signal P, dBm | 20 | 18 | 20 | 16 | 10 | 11 | 9 | 20 | 18 |
| Time periods T | 1 | 2 | 3 | 4 | 5 | 6 | 7 | 8 | 9 |

The collected parameters are used by the client's analysis module 207 to interrogate the state models of the system. The analysis module 207, in interrogating the state models, assesses the conformity of the state of the system 100 and its elements to the requirements for the system. In the example, simple logical models are used, which describe anomalous states of the elements, as follows.

For example, the state model may specify that, if the channel speed in a given state ($V_n$) is significantly less than a threshold speed $V_k$, or significantly greater than the threshold $V_k$, then the anomalous state SPEED_DEGR is used that describes the state of degradation of the network channel (i.e., IF $V_n \ll V_k$ or $V_n \gg V_k$ THEN SPEED_DEGR).

In one example, the state model may specify that if the reallocated sectors count at a given state ($RSC_n$) is less than a threshold count $RSC_k$ and less than the reallocated sectors count in a second state ($RSC_m$), then the anomalous state NVRAM_Sector_DEGR is used that describes the degradation of the NVRAM in the form of a gradual failure of the disk surface, as indicated by an increase in the number of sector reassignment operations, testifying to wear on the surface (i.e., IF $RSC_n<RSC_k<RSC_m$ WHERE $T_n<T_k<T_m$ THEN NVRAM_Sector_DEGR).

In another example, the state model may specify that if the reallocated sectors count is greater than 20, then the anomalous state NVRAM_FAULT is used that describes a failure of the NVRAM due to reaching a critical value of reassigned sectors equal to 20 (i.e., IFRSC>20 THEN NVRAM_FAULT).

In another example, in response to determining that the signal power at a given state ($P_n$) is greater than a threshold signal power value and a signal power at another state ($P_m$), and the signal power of the second state is less than 15 dBm, the anomalous state POWER_DEGR is used that describes the state of degradation of the signal power, indicating a drop in the signal level over time to a critical level of 15 dBm (i.e., IF $P_n>P_k>P_m$ and $P_n<15$ WHERE $T_n<T_k<T_m$ THEN POWER_DEGR).

As a result of the interrogation of the above-described models, the client discovers anomalies at certain moments of time as follows: degradation of the network channel at time $T_3$; degradation of the NVRAM at time $T_6$; failure of the NVRAM at time $T_9$; and degradation of the signal power at time $T_5$.

The degradations are anomalous processes, and the failure is an anomalous state. Having information about an anomaly, the models of recovery methods are interrogated (which for this example are also expressed by logical models) and recovery methods are determined as follows:
  IF POWER_DEGR THEN AREA_EXTEND—to recover the signal power, it is recommended to extend the radius of effective coverage of the router;
  IF SPEED_DEGR WHERE $ENC_n=1$ and $HBE^i=0$ THEN HBE—to recover the speed of the connection, it is recommended to provide hardware encryption support;
  IF SSD_FAULT THEN NVRAM_CHANGE—the failure of the NVRAM should be overcome by replacing the module whereby the element is realized, in the present example by replacing the SSD;
  IF ROM_Sector_DEGR THEN NVRAM_CHANGE or BACKUP—having identified degradation of the surface when the module realizing the element is still operational, it is recommended to consider replacing the module and arranging for a backup copying Having determined the recovery methods, the module capable of realizing the recommended recovery method are determined. In our example, this is done by a query to the database 227, in which tables are designated in accordance with the recovery methods. That module will be chosen which not only realizes the recommended method, but is also compatible with the system in question, for which purpose the query includes certain conditions (the operator WHERE) formed on the basis of the parameters of the system in question. The results of performing the queries are presented together with the queries themselves:

- SELECT * FROM AREA_EXTEND WHERE Spectr='2,4' and IEEE='802.11n' and MaxV>80
  ○ ZYXEL WRE2206
  ○ Tenda A300
  ○ NETGEAR EX2700
  ○ ASUS RP-AC51

-continued

- SELECT * FROM HBE WHERE Spectr='2,4' and IEEE='802.11n' and MaxV_WPA2>80
  ○ ZYXEL NBG-418N v2
  ○ DSL-N16U
  ○ MikroTik hAP mini
- SELECT * FROM NVRAM_CHANGE WHERE Type='SSD' and FF='M.2', and Interface='PCIe3.0' and Value>128
  ○ Intel 600p
  ○ Patriot Hellfire
  ○ Samsung 960 EVO
- SELECT * FROM BACKUP WHERE Type='Remote' and Value>128 and (Trial='Yes' or Free='Yes') and Period='Day' and Scheme='Incremental'
  ○ Acronis Disk Director 12
  ○ Veeam Agent Free More than one module has been found. Additional filters will then be applied to the module so found, taking into account additional characteristics, such as financial solvency of the user, level of IT literacy of the user (not all modules are easy to install), willingness of the user to call in a specialist, popularity of the solution among consumers, reputation of the manufacturer/supplier, and so forth.

In a particular instance, the model of recovery methods might not be interrogated, for example, upon triggering of the model: IF RSC>20 THEN NVRAM_FAULT describes a failure of the NVRAM due to reaching a critical value of reassigned sectors equal to 20.

A query can be made to a database of modules, where the table attributes correspond not to recovery methods, as in the above example, but to anomalies:
  SELECT*FROM NVRAM_FAULT WHERE Type='SSD' and FF='M.2', and Interface='PCIe3.0' and Value>128
when carrying out the method described in FIG. 3B, after detecting the anomaly:
  IF RSC>20 THEN NVRAM_FAULT
Information is obtained as to third-party modules compatible with the system 100, such as can realize the system element whose parameters are determining the anomaly:
  SELECT*FROM NVRAM WHERE Type='SSD' and FF='M.2', and Interface='PCIe3.0' and Value>128
Among the compatible modules found, that module is selected which the anomaly (RSC>20==False) is not found upon interrogating the state model (IF RSC>20 THEN NVRAM_FAULT) with the use of substitute parameters of the module; obviously, in this example, that module will be any properly working module such that the characteristic of that module is an absence of reassigned sectors, in other words, for such module RSC==0.

According to one aspect, the system 100 and/or system 200 described above may be extended to support computer database searches of persons with attributes (characteristics) corresponding to previously stated requirements. For example, such persons may include employees to fill vacant positions or job openings which have certain job requirements, skills, and/or expertise needed for that role. In another example, such persons may include respondents or members of focus groups for marketing research or ergonomic studies of a user interface, which have certain requirements desired for demographic or statistical purposes (e.g., certain age, Android smartphone users, etc.) The search is conducted by previously trained models (vacancy models). Such models may be clusters in a multidimensional space, where each cluster groups together descriptions (such as those presented in the form of vectors of hardware and software parameters) of persons with similar attributes or characteristics. For example, one cluster groups together the descriptions for junior C++ developers; another cluster, for data science specialists. Another example of the trained model may be a tree data structure whose leaf nodes correspond to the classes of specialists, for example, the same junior C++ developer or Data Science specialist. In other cases, the support vector method (SVM), neural nets, expert systems, or any other known method of machine learning may be used. The leaf nodes may also correspond not to a particular class of specialist, but to a certain requirement for the specialist, such as work experience, or certain key skills.

Figure 5:
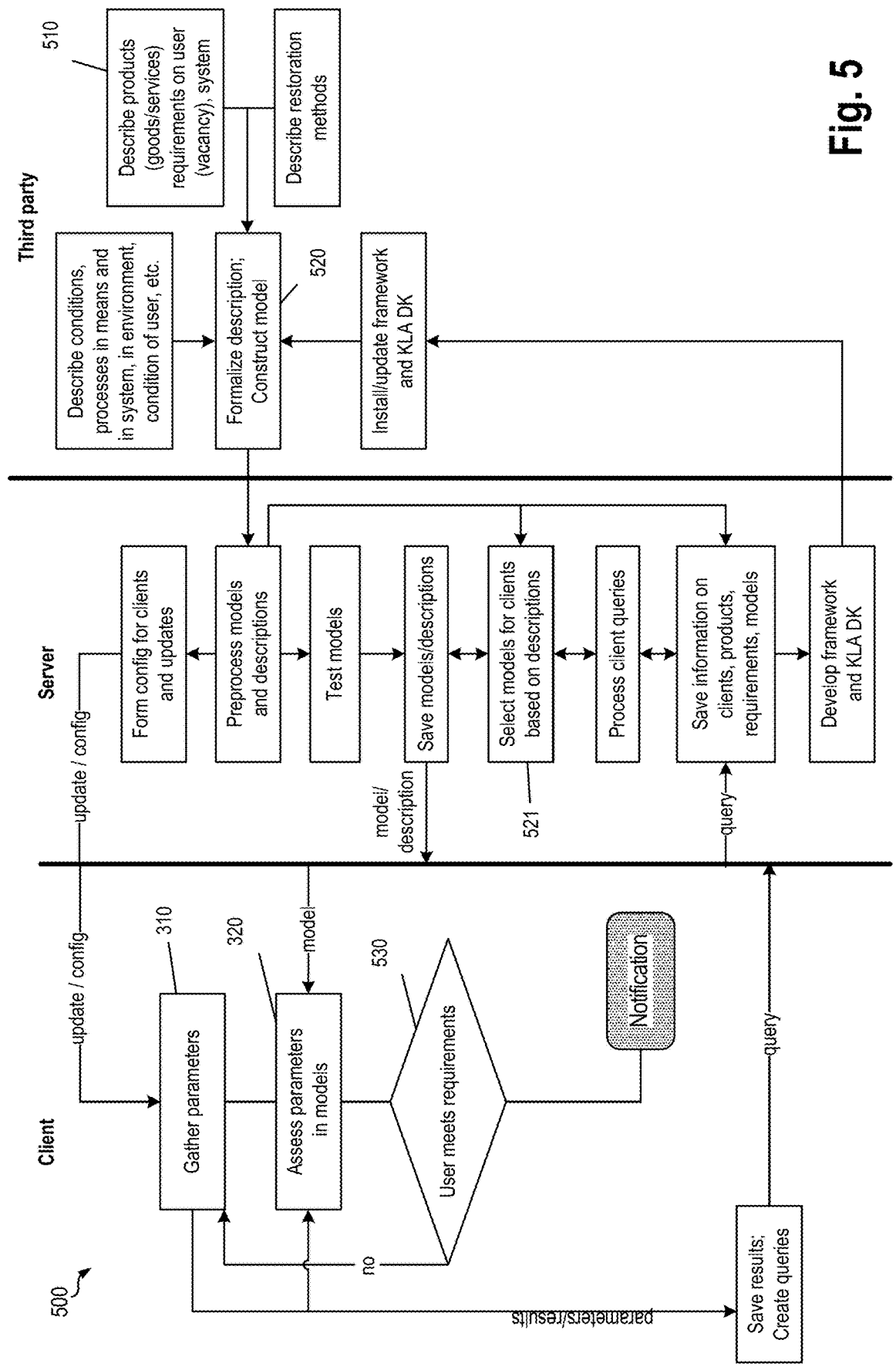
FIG. 5 shows a method of finding users who meet requirements according to an aspect.

FIG. 5 shows a method 500 for searching for, identifying, and targeting users based on requirements, such as job openings, via a computer system and network. At step 510, the requirements on the users are determined by third parties and described, e.g., via user input at a computer device executing on the third-party side. The requirements may be described in various forms, from an arbitrary form to a strict form (structured according to a predetermined data format template) within a certain specification. Such requirements, for example for software developers, may include information relating to: software development experience (seniority, number of successful projects), knowledge of certain syntax of languages, standards, and frameworks, libraries, and so forth. In some aspects, the requirements are described in a received search query that includes one or more search requirements for target users that match the at least one determined characteristic.

Next, in a particular instance, in step 520, the system formalizes the description and constructs a model based on the provided description. The crux of this step involves projecting (in a particular instance, imaging) requirements from the description onto hardware and software parameters of a configuration profile. In some aspects, the system may generate a model of hardware and software indicators of a user, their user account, or their computing devices that are correlated to the described requirements (e.g., skills, experience) without expressly indicating that requirement (e.g., in a curriculum vitae). In some aspects, the model of hardware and software indicators may correlate a job requirement indicating a specified time duration of experience with a programming language with the model hardware and software parameters indicating files are stored on a system of the target user that have a file extension indicating source code files of the programming language and that have a file modification date greater than or equal to the specified time duration. In some aspects, the model of hardware and software indicators may correlate the job requirement indicating a specified amount of technical experience with the model hardware and software parameters indicating a threshold amount of commits to a code repository associated with the technical experience. For example, the description of "3 years seniority and experience in Java language" will be transformed into indicators comprising: presence of files from 3 years ago with file extensions corresponding to that programming language (e.g., ".java files"), the number of these files, the time spent in a development environment associated with that experience requirement (e.g., Java IDE), the timing and frequency of code publications (i.e., commits) on the public or private code repositories (e.g., GitHub or SourceForge), the presence of a special tool kit. In some aspects, the model of hardware and software indicators may correlate indicating experience with a software development library with the model hardware and software parameters indicating presence of the software development library on the system of the target user and further indicating frequency of accessing the software development library. For example, the system may transform a description of the requirement of the knowledge of a particular framework into indicators for the presence of these frameworks on the user's device and the frequency of accessing such frameworks on that device, and so forth. The model will be formed from the projections so obtained. In another particular instance, an already finished model is chosen for the description in step 521, which is expedient when there is no description of the requirements, or the description is incomplete, for example, the requirements only contain the position of a senior C++ developer. The methods of constructing such models are illustrated in FIG. 6 described below.

In step 310 the hardware and software parameters of the system are gathered. In one aspect, the configuration profiles of computing systems of a plurality of target users are accessed. The profiles include at least information about hardware, software, and data files of computing systems of the target users. In some aspects, the collection module 206 of the client 205 collects a configuration profile of hardware and software parameters of the system 100 from the elements realizing the specified functionality of this system 100. The configuration profile of a user's system may include information related to the current state of the hardware and software resources, including a listing of amounts, types, and capabilities of computing, memory, storage, and networking resources; and metadata of files stored within the system 100. The configuration profile of a user's system may include information related to external online resources accessed by the user, such as online activity and social media activity (e.g., Facebook, Twitter, LinkedIn).

In step 520, the model is constructed or selected in step 521 and describing the skills of the user is polled with the use of the parameters so gathered and the conformity of the system user to the described requirements is assessed in step 320; if the user of this device conforms to the requirements, the information about this is sent either to a third party or the user himself or herself is notified. In some aspects, the configuration profiles of the computing systems of said target users are analyzed using the machine learning model to identify one or more target users that match the one or more search requirements of the search query. At least one target user is identified that matches the at least one determined characteristic specified in the search query based on analysis of the configuration profile of the computing system of said target user by the machine learning model.

Models trained on previously marked data may also be used in turn for the formalization of the requirements and the construction of the models in step 520. The marked data will be the configuration profiles (hardware and software parameters) of the systems whose user attributes are known, in other words, the requirements possessed by those users are known. For example, it is known that the user is a C++ developer in Windows and Linux with 5 years development experience, working with Boost, relational databases, and Jenkins. The purpose of the training of the model is to associate the high-level requirements with the hardware and software parameters of the system (low-level requirements).

FIG. 6a shows a method 600A of constructing a formalization model wherein in step 610 parameters are obtained on at least one system. In one aspect, the system obtains configuration profiles of computing systems operated by sample users, wherein the users have at least one determined characteristic. In step 620 the characteristics of a sample system user are gathered from the elements realizing the functionality of the system. In step 630 the formalization model is trained. In one aspect, the system generates a machine learning model that associates the determined characteristic of the sample users with the configuration profiles of the computing systems of the sample users. In some aspects of the training process, at least one characteristic (e.g., job qualification/requirement) of the sample system user is presented to the input of the model being trained, while the output values are compared to the sample hardware and software parameters of the system whose user conforms to the characteristic. In some aspects, a variant embodiment of this method uses a form of supervised machine learning referred to as back propagation of errors. FIG. 6b shows an alternative method 600B of constructing the formalization model, in which parameters on at least one system are obtained in step 610, in step 620 the characteristics of the system user are gathered from the elements realizing the functionality of the system, and in step 640 the formalization model is constructed for the association of the characteristics of the system user with the parameters of this system. Regardless of the method chosen for the training of the formalization model, in the final analysis the characteristic of the user should be projected onto the corresponding hardware and software parameters of the system. The obtained models may be used either independently, or be aggregated, and even work in reverse order. For example, a requirement is presented for a developer: 5 years development experience and knowledge of a software library (e.g., Boost framework/library for C++ software development); for this, in a particular instance, we shall use a model which projects the required experience onto the corresponding hardware and software parameters and a model which will determine the way the parameters indicate working with Boost. On the basis of the parameters so determined, vectors are laid out in multidimensional space—which will in fact be the vacancy model. These vectors will be compared to the vectors obtained from the parameters gathered from the user's system in step 310. In another instance, if the formalization models constitute decision making trees, no vectors are constructed, and the models are polled in step 520 by the parameters gathered in step 310.

According to example 1, a method of finding users who meet requirements is provided, wherein (a) the requirements on the user are obtained; (b) the hardware and software parameters describing the obtained requirements are determined; (c) a model is formed, describing the requirements on the user in terms of the hardware and software parameters; (d) the hardware and software parameters of the system are gathered; (e) the model describing the requirements on the user is polled, using the collected parameters, and the conformity of the system user to the requirements per item (a) is evaluated; and (f) a user conforming to the requirements obtained in item (a) is found.

In example 2, the method provided is according to example 1, wherein the hardware and software parameters describing the obtained requirements are projections of the obtained requirements on the user onto the space of the hardware and software.

In example 3, the method provided is according to example 2, wherein the projecting is done by a previously trained model.

In example 4, the method of training the model according to example 3, wherein: (a) parameters are obtained on at least one system from hardware and software realizing the functionality of the system; (b) the characteristics of the user of the system from item a) are gathered; (c) the model is trained, where at least one characteristic of the system user is presented to the input of the trained model, and the output values are compared to the hardware and software parameters of the system whose operator corresponds to the characteristic, and the model is corrected on the basis of the comparison.

In example 5, the method of training the model according to example 3, wherein: (a) parameters are obtained on at least one system from elements realizing the functionality of the system; (b) the characteristics of the user of the system from item (a) are gathered; (c) a model is constructed for the association of the characteristics of the system user with the parameters of this system.

In example 6, the Method of finding users who meet requirements is provided, wherein (a) the requirements on the user are obtained; (b) a trained model is selected to find users meeting the obtained requirements; (c) the hardware and software parameters of at least one system are gathered; (d) the selected model is polled, using the collected parameters, and the conformity of the system user to the requirements per item a) is evaluated; and (e) a user conforming to the requirements obtained in item a) is found.

In example 7, the Method of training the model according to example 6 is provided, wherein: (a) the parameters of at least one system are obtained from the hardware and software realizing the functionality of the system; (b) the characteristics of the user of the system from item (a) are gathered; (c) the model is trained, where at least one characteristic of the system user is presented to the input of the trained model, and the output values are compared to the hardware and software parameters of the system whose operator corresponds to the characteristic.

In example 8, the Method of training the model according to example 6, wherein: (a) parameters are obtained on at least one system from elements realizing the functionality of the system; (b) the characteristics of the user of the system from item (a) are gathered; and (c) a model is constructed for the association of the characteristics of the system user with the parameters of this system.

By the modules of the system 200 is meant actual devices, systems, components, a group of components, realized with the use of hardware such as integrated microcircuits (application-specific integrated circuit, ASIC) or a field-programmable gate array (FPGA) or, for example, in the form of a combination of software and hardware such as a microprocessor system and a set of program instructions, and also based on neurosynaptic chips. The functionality of the indicated modules may be realized exclusively by hardware, and also in the form of a combination, where some of the functionality is realized by software and some by hardware. In certain variant embodiments, the module can be implemented on the processor of a computer (such as the one depicted in FIG. 5). The databases may be realized by all possible methods and be contained either on a single physical medium or on various media, situated either locally or remotely.

FIG. 7 is a block diagram illustrating a computer system 20 on which aspects of systems and methods for detecting compatible modules for systems with anomalies may be implemented in accordance with an exemplary aspect. It should be noted that the computer system 20 can correspond to any of the base elements 104, for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, static random access memory (SRAM), dynamic random access memory (DRAM), zero capacitor RAM, twin transistor RAM, enhanced dynamic random access memory (eDRAM), extended data output random access memory (EDO RAM), double data rate random access memory (DDR RAM), electrically erasable programmable read-only memory (EEPROM), NRAM, resistive random access memory (RRAM), silicon-oxide-nitride-silicon (SONOS) based memory, phase-change random access memory (PRAM); flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for searching users that meet one or more labor market search requirements, comprising:
   obtaining configuration profiles of computing systems operated by sample users, wherein the users have at least one determined characteristic and wherein the at least one characteristic indicates at least user's technical experience;
   generating a machine learning model that associates the determined characteristic of the sample users with the configuration profiles of the computing systems of the sample users, wherein the machine learning model is configured to correlate the characteristic indicating a specified amount of technical experience with the configuration profiles;
   receiving a search query comprising one or more search requirements for target users that match the at least one determined characteristic, wherein the one or more search requirements include at least the specified amount of technical experience;
   accessing, by a processor, configuration profiles of computing systems of a plurality of target users, wherein said configuration profiles include at least information about hardware, software and data files of computing systems of said target users indicating technical experience of respective users;
   analyzing, by the processor, the configuration profiles of the computing systems of said target users using the machine learning model to identify one or more target users that match the one or more search requirements of the search query, wherein analyzing the configuration profiles comprises analyzing one or more software and data files of computing systems of said target users; and
   identifying, by the processor, at least one target user that matches the at least one determined characteristic specified in the search query based on analysis of the configuration profile of the computing system of said target user by the machine learning model.

2. The computer-implemented method of claim 1, further comprising:
   accessing, by a processor, a plurality of online content associated with the target users, including one or more of personal or professional social networking sites of the target users;
   analyzing, by the processor, online content posted and/or shared by the target users using the machine learning model to identify one or more target users that match the one or more search requirements of the search query; and
   identifying, by the processor, at least one target user that matches the at least one determined characteristic specified in the search query based on analysis of the online content of said target user by the machine learning model.

3. The computer-implemented method of claim 1, wherein the machine learning model is modified by a training process comprising:
   obtaining the configuration profiles of the computing systems of the sample users having the at least one determined characteristic;
   executing the machine learning model using at least one characteristic of the sample user as an input value; and correcting the machine learning model based on a comparison of output values of the machine learning model to the configuration profiles.

4. The computer-implemented method of claim 1, wherein the machine learning model is configured to correlate the characteristic indicating a specified time duration of technical experience with a programming language with the configuration profiles indicating files are stored on a system of the target user that have a file extension indicating source code files of the programming language and that have a file modification date greater than or equal to the specified time duration.

5. The computer-implemented method of claim 1, wherein the machine learning model is configured to correlate the characteristic indicating a specified amount of technical experience with configuration profiles indicating a threshold amount of commits to a code repository associated with the technical experience.

6. The computer-implemented method of claim 1, wherein the machine learning model is configured to correlate the characteristic indicating technical experience with a software development library with configuration profiles indicating presence of the software development library on the system of the target user and further indicating frequency of accessing the software development library.

7. A system for searching users that meet one or more search requirements, comprising:
   a memory device storing configuration profiles of computing systems operated by sample users having at least one determined characteristic, wherein the at least one characteristic indicates at least user's technical experience; and
   a hardware processor coupled to the memory device, wherein the hardware processor is configured to:
      generate a machine learning model that associates the determined characteristic of the sample users with the configuration profiles of the computing systems of the sample users, wherein the machine learning model is configured to correlate the characteristic indicating a specified amount of technical experience with the configuration profiles;
      receive a search query comprising one or more search requirements for target users that match the at least one determined characteristic, wherein the one or more search requirements include at least the specified amount of technical experience;
      access configuration profiles of computing systems of a plurality of target users, wherein said configuration profiles include at least information about hardware, software and data files of computing systems of said target users indicating technical experience of respective users;
      analyze the configuration profiles of the computing systems of said target users using the machine learning model to identify one or more target users that match the one or more search requirements of the search query, wherein the hardware processor configured to analyze the configuration profiles is further configured to analyze one or more software and data files of computing systems of said target users; and
      identify at least one target user that matches the at least one determined characteristic specified in the search query based on analysis of the configuration profile of the computing system of said target user by the machine learning model.

8. The system of claim 7, wherein the hardware processor is configured to:
   access a plurality of online content associated with the target users, including one or more of personal or professional social networking sites of the target users;
   analyze online content posted and/or shared by the target users using the machine learning model to identify one or more target users that match the one or more search requirements of the search query; and
   identify at least one target user that matches the at least one determined characteristic specified in the search query based on analysis of the online content of said target user by the machine learning model.

9. The system of claim 7, wherein the machine learning model is modified by a training process comprising:
   obtaining the configuration profiles of the computing systems of the sample users having the at least one determined characteristic;
   executing the machine learning model using at least one characteristic of the sample user as an input value; and
   correcting the machine learning model based on a comparison of output values of the machine learning model to the configuration profiles.

10. The system of claim 7, wherein the machine learning model is configured to correlate the characteristic indicating a specified time duration of technical experience with a programming language with the configuration profiles indicating files are stored on a system of the target user that have a file extension indicating source code files of the programming language and that have a file modification date greater than or equal to the specified time duration.

11. The system of claim 7, wherein the machine learning model is configured to correlate the characteristic indicating a specified amount of technical experience with configuration profiles indicating a threshold amount of commits to a code repository associated with the technical experience.

12. The system of claim 7, wherein the machine learning model is configured to correlate the characteristic indicating technical experience with a software development library with configuration profiles indicating presence of the software development library on the system of the target user and further indicating frequency of accessing the software development library.

13. A non-transitory computer readable medium comprising computer executable instructions for searching users that meet one or more labor market search requirements, including instructions for:
   obtaining configuration profiles of computing systems operated by sample users, wherein the users have at least one determined characteristic and wherein the at least one characteristic indicates at least user's technical experience;
   generating a machine learning model that associates the determined characteristic of the sample users with the configuration profiles of the computing systems of the sample users, wherein the machine learning model is configured to correlate the characteristic indicating a specified amount of technical experience with the configuration profiles;
   receiving a search query comprising one or more search requirements for target users that match the at least one determined characteristic, wherein the one or more search requirements include at least the specified amount of technical experience;
   accessing, by a processor, configuration profiles of computing systems of a plurality of target users, wherein said configuration profiles include at least information about hardware, software and data files of computing systems of said target users indicating technical experience of respective users;

analyzing, by the processor, the configuration profiles of the computing systems of said target users using the machine learning model to identify one or more target users that match the one or more search requirements of the search query, wherein analyzing the configuration profiles comprises analyzing one or more software and data files of computing systems of said target users; and identifying, by the processor, at least one target user that matches the at least one determined characteristic specified in the search query based on analysis of the configuration profile of the computing system of said target user by the machine learning model.

14. The non-transitory computer readable medium of claim 13 further comprising instructions for:

accessing a plurality of online content associated with the target users, including one or more of personal or professional social networking sites of the target users;

analyzing online content posted and/or shared by the target users using the machine learning model to identify one or more target users that match the one or more search requirements of the search query; and identifying at least one target user that matches the at least one determined characteristic specified in the search query based on analysis of the online content of said target user by the machine learning model.

15. The non-transitory computer readable medium of claim 13, wherein the machine learning model is modified by a training process comprising:

obtaining the configuration profiles of the computing systems of the sample users having the at least one determined characteristic;

executing the machine learning model using at least one characteristic of the sample user as an input value; and correcting the machine learning model based on a comparison of output values of the machine learning model to the configuration profiles.

16. The non-transitory computer readable medium of claim 13, wherein the machine learning model is configured to correlate the characteristic indicating a specified time duration of technical experience with a programming language with the configuration profiles indicating files are stored on a system of the target user that have a file extension indicating source code files of the programming language and that have a file modification date greater than or equal to the specified time duration.

17. The non-transitory computer readable medium of claim 13, wherein the machine learning model is configured to correlate the characteristic indicating a specified amount of technical experience with configuration profiles indicating a threshold amount of commits to a code repository associated with the technical experience.

18. The non-transitory computer readable medium of claim 13, wherein the machine learning model is configured to correlate the characteristic indicating technical experience with a software development library with configuration profiles indicating presence of the software development library on the system of the target user and further indicating frequency of accessing the software development library.

* * * * *